United States Patent

[11] 3,586,426

| [72] | Inventor | Rene Bras |
| | | New York, N.Y. |
| [21] | Appl. No. | 775,023 |
| [22] | Filed | Nov. 12, 1968 |
| [45] | Patented | June 22, 1971 |
| [73] | Assignee | Depthimation Inc. |
| | | New York, N.Y. |

[54] METHOD AND APPARATUS FOR ANIMATION
11 Claims, 7 Drawing Figs.
[52] U.S. Cl. .................................................. 352/52, 352/87
[51] Int. Cl. .................................................. G03b 41/00
[50] Field of Search .................................. 352/52, 50, 87, 85

[56] References Cited
UNITED STATES PATENTS

| 2,054,414 | 9/1936 | Fleischer .................... | 352/52 |
| 2,198,006 | 4/1940 | Garity ........................ | 352/87 |
| 2,522,662 | 9/1950 | Brier .......................... | 352/52 |

*Primary Examiner*—S. Clement Swisher
*Assistant Examiner*—Denis E. Corr
*Attorney*—Blum, Moscovitz, Friedman and Kaplan ABSTRACT: A method and apparatus for animation wherein a total scene is divided into a plurality of substantially two-dimensional portions according to the distance of said portions from the viewing point of said total scene. The portions are disposed in adjacent relation and successively photographed. Each of the portions are displaced between successive photograph takings in an edgewise direction a distance substantially inversely proportional to the distance of said portion from the viewing point of said total scene.

INVENTOR.
RENE BRAS

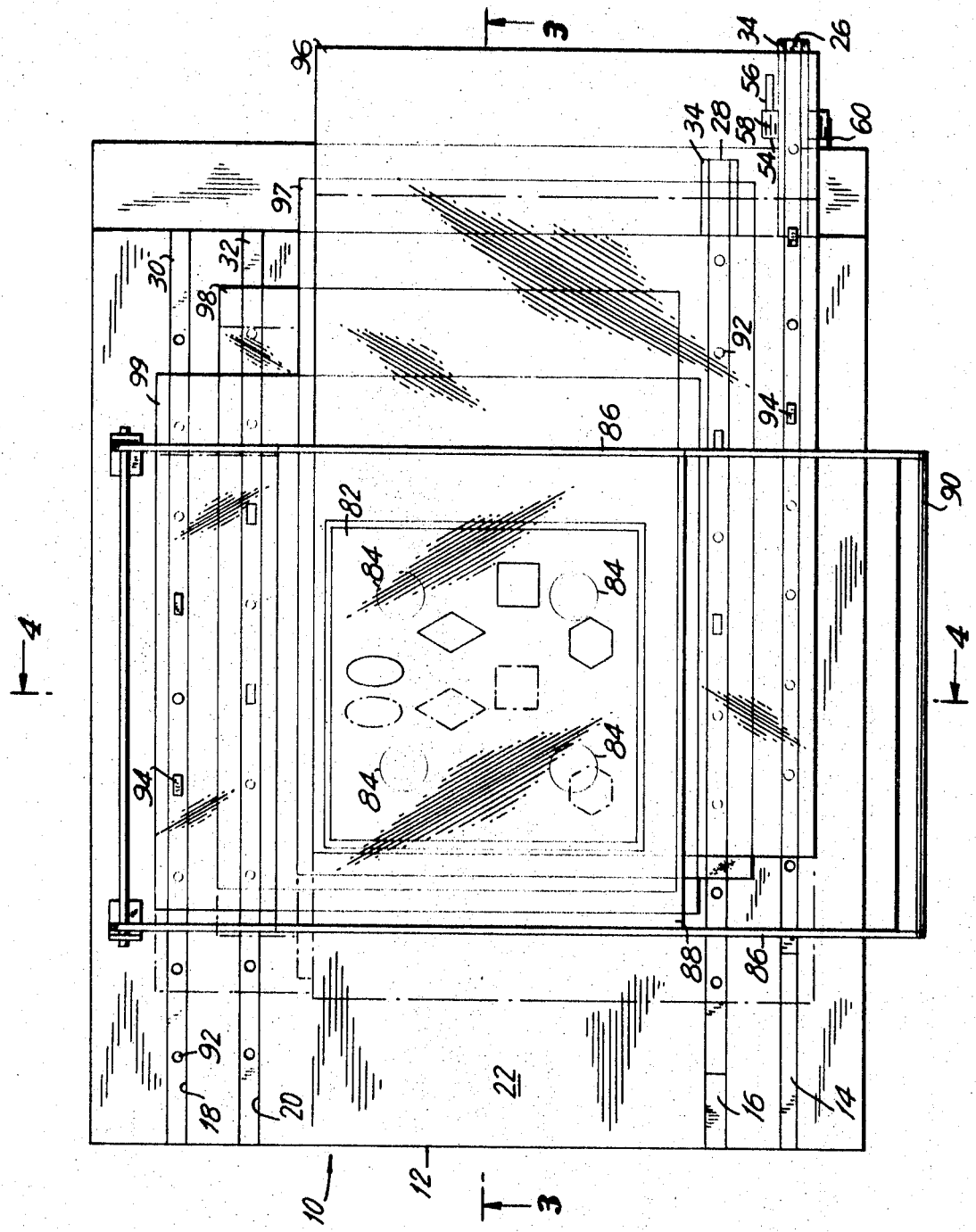

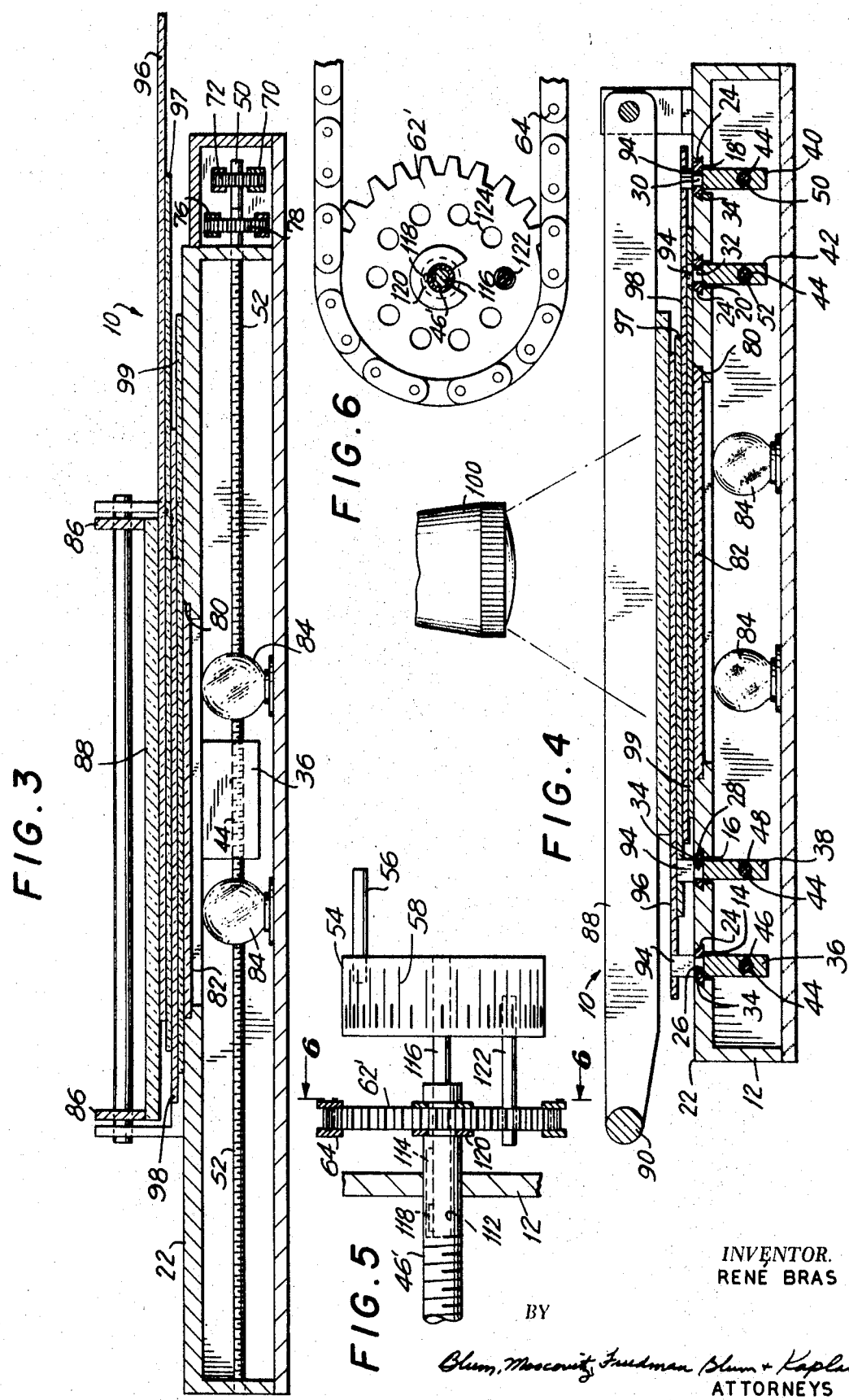

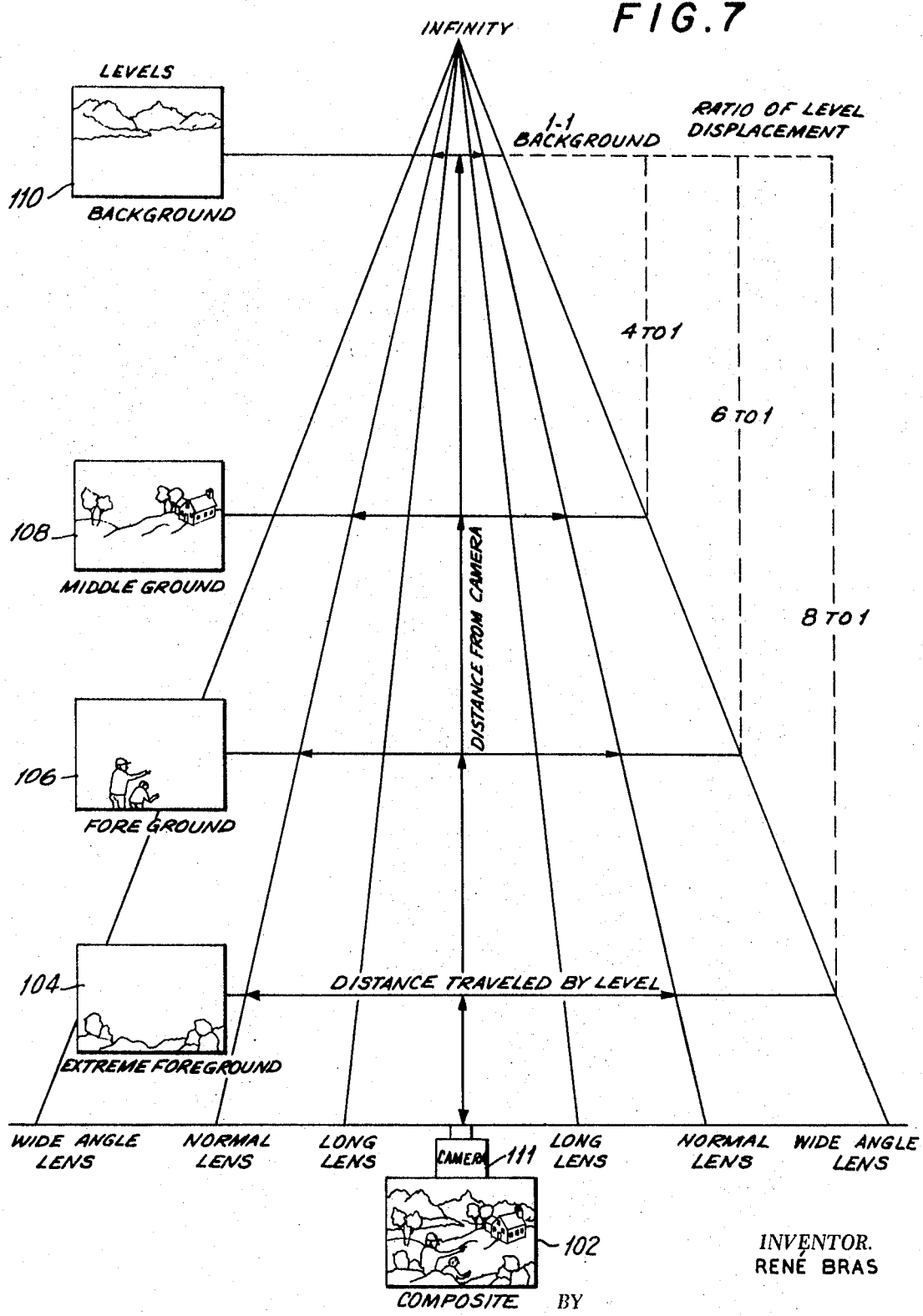

METHOD AND APPARATUS FOR ANIMATION

BACKGROUND OF THE INVENTION

This invention relates generally to animation for use in the production of cartoons and other forms of motion pictures. In the art, the creation of the illusion of three-dimensions in cartoons and other animated motion pictures has required the laborious drawing of the entire scene shown in each frame of the series of frames making up the total motion picture. The relative position of the various portions of the total scene are changed in each successive drawing to create the photographic illusion of three-dimensions. This process is extremely time consuming and costly and requires the services of a large number of highly skilled artists.

Many attempts have been made to overcome this problem. All of these devices such as the arrangement taught in U. S. Patent No. 2,054,414, issued to Max Fleischer on Sept. 15, 1936, require elaborate structural arrangements while not providing the full flexibility required for the creation of a realistic illusion of three-dimensions.

SUMMARY OF THE INVENTION

Generally speaking, in accordance with the invention, a total scene is animated by dividing said total scene into a plurality of substantially two-dimensional portions according to the distance of said portions from the viewing point of said total scene, disposing a plurality of said two-dimensional portions in adjacent relation, and successively photographing said related portions while displacing each of said portions between successive photographs takings in an edgewise direction a distance substantially inversely proportional to the distance of said respective portion from the viewing point of said total scene. In this manner, the photographic illusion of three-dimensions is created in a series of frames as the same are projected as a motion picture.

When in addition at least one of said portions is displaced between successive photograph takings a further distance which varies, by an amount which changes with each successive photograph, from the distance substantially inversely proportional to the distance of said respective portion from the viewing point of said total scene, the photographic illusion is created in said series of frames that said portion is moving toward or away from the other of said portions. By changing the appearance of at least one of said scene portions between successive photographs, that figure is animated and to the viewer of a motion picture produced according to the invention, it appears that the animated figure is moving in a three-dimensional scene.

Also in accordance with the invention, an apparatus for animating a motion picture formed from a series of still pictures is provided which includes a plurality of transparent sheets each having, disposed thereon, a portion of a total scene divided according to the distance of each portion from the viewing point, means for supporting said sheets in adjacent relation in the field of a camera and a plurality of displacing means, each of said displacing means being adapted to displace one of said sheets in an edgewise direction. Controlling means are provided for controlling the relative movement of said sheets whereby each of said sheets is displaced a distance substantially inversely proportional to the distance of the portion of said total scene disposed thereon from the viewing point of said total scene.

In one embodiment of the apparatus according to the invention, drive means is connected to one of said displacing means for operation thereof while the controlling means is connected to said drive means for imparting the drive thereof to the displacing means of the other of said sheets. The drive means is preferably provided with a graduated scale to facilitate successive displacement of said sheet in predetermined increments. The apparatus may include a rotating shaft associated with each sheet for displacing same, a plurality of sprocket wheels mounted on said shafts and a plurality of chains engaging said sprocket wheels interconnecting said shafts. In this arrangement, the relative diameter of the sprocket wheel engaging each chain is proportional to relative distance that the sheets associated with said sprocket wheels are to be displaced.

In a further embodiment of the apparatus according to the invention, means are provided for displacing at least one of said sheets a further distance to create the illusion that the portion of said total scene disposed on said sheet is moving toward or away from the portion disposed on other of said sheets.

Accordingly, it is an object of this invention to provide a method and apparatus adapted to create, in a series of frames as the same are projected, a photographic illusion of three-dimensions.

Another object of the invention is to provide a method and apparatus for animation which is adapted to create a photographic illusion that a three-dimensional scene is being horizontally or vertically panned by a camera.

A further object of the invention is to provide a method and apparatus for animation which is both simple to operate and construct while being flexible in the nature of the effects that may be created.

Still another object of the invention is to provide an apparatus for animation which is substantially flat and compact, permitting the use of a single light source and the disposition of the camera at a plurality of angles and distances therefrom to enable the creation of a variety of effects.

Still other objects and advantages of the invention will in part be obvious and will in part be apparent from the specification.

The invention accordingly comprises the several steps and the relation of one or more of such steps with respect to each of the others, and the apparatus embodying the features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a top plan view of the apparatus for animation according to the invention as it would be after a plurality of successive photograph takings, said transparent sheets being shown in phantom lines as they would be during the initial photograph taking;

FIG. 3 is a sectional view taken along the lines 3–3 of FIG. 1;

FIG. 4 is a sectional view taken along the lines 4–4 of FIG. 1;

FIG. 5 is a sectional view of an alternative embodiment of a portion of the apparatus for animation according to the invention;

FIG. 6 is a sectional view taken along lines 6–6 of FIG. 5;

FIG. 7 is a graphical representation of the relationship between the opening of the lens of the camera viewing the total scene, the distance of the camera viewing the total scene, the distance of the camera from the portions of the total scene and the relative distance that said portion must be displaced to create the illusion of three-dimensions.

DESCRIPTION OF THE PREFERRED EMBODIMENTS

Figure 1:
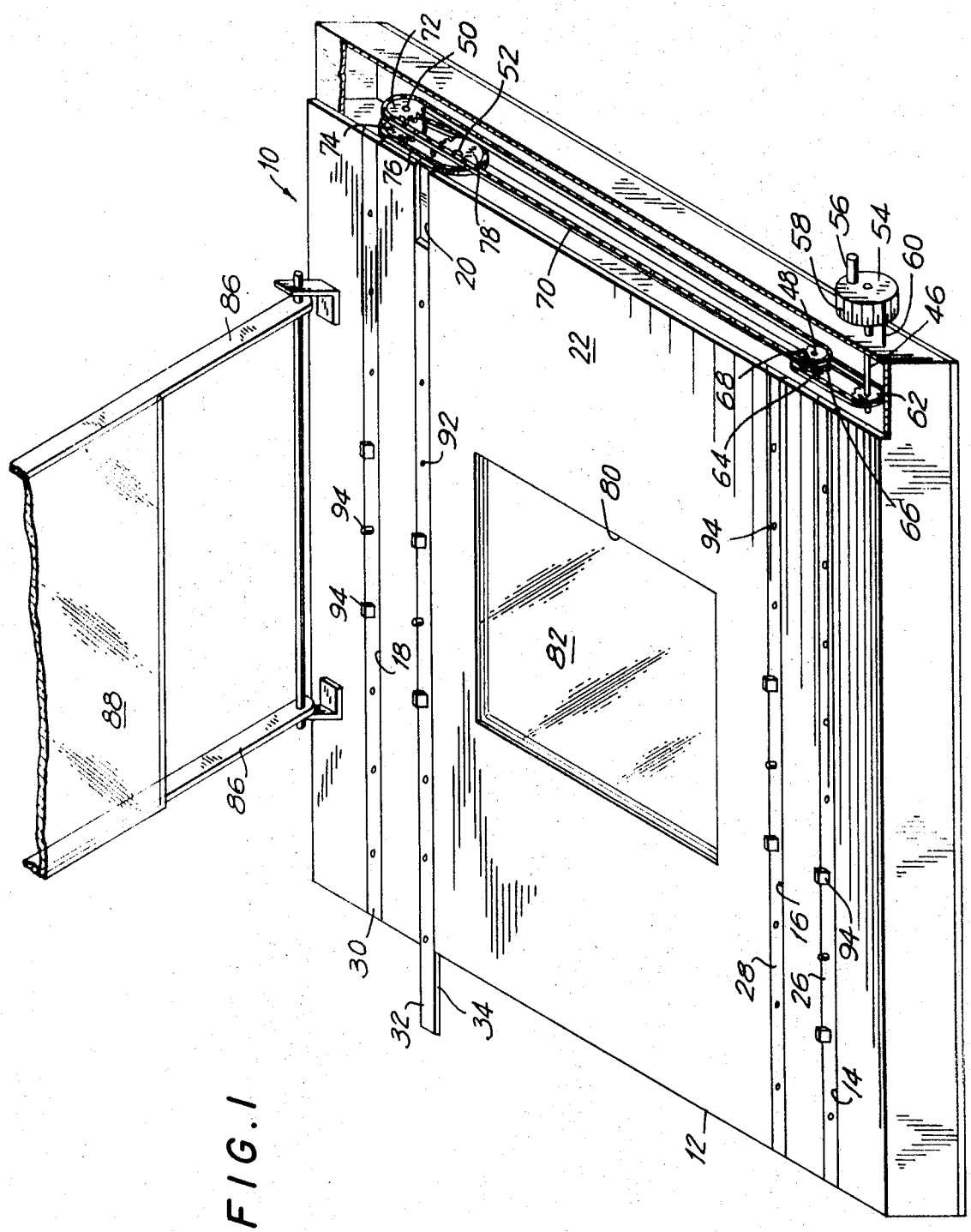
FIG. 1 is a perspective view of the apparatus for animation in accordance with the invention before placement of the transparent sheets having the portions of the total scene disposed therein.

Referring now to FIG. 1, the apparatus 10 for animating a motion picture formed from a series of still pictures depicted incorporates a frame 12 having four substantially identical parallel channels 14, 16, 18 and 20 formed in the top surface 22 thereof. Each of said channels is formed with a pair of grooves 24 on the inner walls thereof. One of bars 26, 28, 30 and 32 is disposed in each of said channels 14, 16, 18 and 20. Each of said bars is formed with shoulders 34 adapted to be received in grooves 24 to support said bars within said channels while permitting said bars to be slidably displaced therealong. Said bars are displaced by means of blocks 36, 38, 40 and 42 each of which is formed with a threaded aperture 44 therethrough adapted to engage one of four threaded shafts 46, 48, 50 and 52. As seen in FIG. 3, each of said shafts is rotatably mounted on frame 12. The cooperation of said threaded shaft and the threaded aperture within blocks 36, 38, 40 and 42 causes said blocks to be displaced longitudinally along said shafts upon the rotation of said shafts, each of bars 26, 28, 30 and 32 being carried and displaced by the displacement of its respective block.

Fixedly secured to one end of first shaft 46 is wheel 54 adapted to rotatably drive said shaft. Handle 56 is fixed to the periphery of said wheel to facilitate the rotation of said wheel. A graduated scale 58 is preferably marked on the periphery of wheel 54. The scale cooperates with finger 60 to provide means for measuring the amount of rotation of wheel 54, and therefore the amount of displacement of first bar 26.

The first shaft 46 is connected to the other shafts 48, 50 and 52 by means of a plurality of sprocket wheels and chains adapted to rotate said other shafts in response to the rotation of wheel 54 and to control the relative rotative displacement of said shafts. Thus, sprocket wheel 62 is fixedly secured to shaft 46 and connected by means of chain 64 to sprocket wheel 66 which is fixed to shaft 48. In like manner, a second sprocket wheel 68 is also fixed to shaft 48 and connected by means of chain 70 to sprocket wheel 72 which in turn is fixedly connected to shaft 50. Also in like manner, a second sprocket wheel 74 is also secured to shaft 50 and connected, by means of chain 76 to sprocket wheel 78 which is fixed to shaft 52.

The relative diameters of said sprocket wheels are chosen, in a manner to be described below, whereby the relative diameter of the sprocket wheels engaging each chain is proportional to the relative distance that the bars associated with said sprocket wheels are to be displaced. Thus, in the embodiment shown in the drawings, sprocket wheel 62 is of a smaller diameter than sprocket wheel 64 whereby bar 26 will be displaced a greater distance than bar 28 upon the rotation of wheel 54. In like manner, sprocket wheel 68 is of a smaller diameter than sprocket wheel 72 and sprocket wheel 74 is of a smaller diameter than sprocket wheel 78. Accordingly, upon the rotation of wheel 54, second bar 28 will be displaced a shorter distance than first bar 26, third bar 30 will be displaced a shorter distance than second bar 28 while fourth bar 32 will be displaced the least.

Centrally disposed in top surface 22 of frame 12 is an aperture 80 having a transparent plate 82 formed from a material such as glass disposed therein. Mounted within frame 12 immediately below plate 82 are four light fixtures 84. Hingedly mounted on frame 12 is support 86 carrying transparent platen 88. The support is provided with a handle 90 so that said platen may be readily raised and lowered.

Each of bars 26, 28, 30, and 32 are formed with a plurality of spaced apertures 92 on the top surface thereof adapted to receive removable pegs 94 which extend upwardly from said bars. Said pegs are adapted to engage an aperture in and to retain transparent sheets 96, 97, 98, and 99 as more particularly shown in FIG. 4.

One of said sheets is associated with and secured to each of bars 26, 28, 30, and 32. They are disposed in overlapping relation with first sheet 96 on top, and second sheet 97, third sheet 98 and fourth sheet 99 being disposed under said first sheet in that order. Each of said sheets will be displaced in an edgewise direction in response to the longitudinal displacement of its respective bar.

Referring now to FIG. 2, the apparatus for animation according to the invention is shown with the sheets in place and the platen 88 lowered to hold said sheets between said platen and glass plate 82. A camera 100, practically shown in FIG. 4 is disposed above the platen to photograph the scene disposed on said sheets.

Referring now to FIG. 7, a composite total scene 102 is shown divided into portions according to the distance of said portions from the viewing point of said total scene. Thus, total scene 102 is divided into an extreme foreground portion 104, a foreground portion 106, a middle ground portion 108, and a background portion 110 as viewed from a viewing point shown schematically by camera 111. Thus, the viewing point is the point from which the actual three-dimensional total scene is or was viewed. It is well known that when one pans a three-dimensional scene the extreme foreground appears to be moving at a greater speed than the background. It has been found that the various portions of a total scene divided according to the distance of said portions from the viewing point of said total scene, appears to move at a speed substantially inversely proportional to the distance of said respective portion from said viewing point. It has also been found that the apparent relative speed of the various portions of the total scene also depends on the nature of the lens of the camera located at the viewing point. Thus, if a long lens is utilized, the extreme foreground appears to be moving at a slower speed than if a wide angle lens is utilized. The relationship between these various factors is graphically represented in FIG. 7. Thus, if a wide angle lens is utilized at the viewing point, and the background portion 110 of the total scene 102 appears to move a unit distance in a certain time, the middle grounds will appear to move about four times as far, the foreground will appear to move about six times as far while the extreme foreground will appear to move about eight times as far as said background.

The method and apparatus according to the invention applies the foregoing principal by dividing a total scene into a plurality of portions according to the distance of said portions from the viewing point of said total scene and disposing each of said portions on one of said sheets 96, 97, 98, and 99. The relative diameter of the various sprockets is selected so that each of said sheets may be displaced a distance substantially inversely proportional to the distance of said respective portion from the viewing point of said total scene. The scene is animated by successively photographing said related portions, displacing each of said portions between successive photograph takings in an edgewise direction an incremental distance by turning wheel 54. When the frames produced in this manner are projected as a motion picture, the photographic illusion of three-dimension is created. It has been found that this illusion is achieved even though the sheets being photographed are held together in adjacent relation between platen 88 and glass plate 82 during each photographic taking. Substantially all of the light required for illumination of the total scene is acquired from light fixtures 84, although top lighting may be provided if desired.

The relative movement of the various sheets may be seen in FIG. 2 wherein, in solid lines, the apparatus for animation 10 is shown disposed as it would be after a plurality of successive photograph takings. Transparent sheets 96, 97, 98 and 99 are shown in phantom lines in the position they would preferably occupy at the first photograph taking. For purposes of illustration, a hexagon is disposed on first sheet 96, a square on second sheet 97, a diamond on third sheet 98 and an ellipse on fourth sheet 99. One photograph would be taken with the sheets and the indicia thereon disposed in the initial position (phantom lines). Wheel 54 will then be rotated a predetermined amount, thereby displacing each of said sheets a distance proportional to the distance between the portion of the total scene disposed thereon and the viewing point of said total scene. Another photograph would be taken at this new location. This process would be repeated to produce the frames of the motion picture, wheel 54 being rotated in small substantially uniform increments between each photograph taking. At one of these later frames, the sheets and the indicia thereon, namely the hexagon, square, diamond and ellipse, would be disposed as shown in solid lines in FIG. 2. When the motion picture formed from said frames if projected, a photographic illusion of three-dimension is created.

The foregoing arrangement is extremely flexible in that both horizontal and vertical pans in either direction can be achieved, depending upon the orientation of the sheets on the apparatus. Further, camera 100 may be disposed at any desired angle or the distance between said camera and apparatus 10 may be varied in order to further vary the effects that may be created.

If desired, further animation effects may be created by varying one or more of the portions of the total scene using conventional animation techniques. Thus, the figures in foreground 106 may be made to appear to be walking through the total scene by substituting a different foreground portion between successive photographs in a conventional manner. Each successive foreground portion would show the figures in a slightly different pose representative of the various poses adopted while walking. One advantage of the method and apparatus according to the invention is that it would be necessary only to redraw the particular figures to be animated, while the balance of the scene need not be redrawn.

Still a further embodiment of the apparatus according to the invention as shown in FIGS. 5 and 6. In this embodiment, first shaft 46' is modified by having its end formed with bore 112 having a keyway 114 formed in the wall thereof. Wheel 54, instead of being fixedly secured to said first shaft, is mounted on a separate shaft 116 which is longitudinally slidable within bore 112. Shaft 116 is provided with a key 118 adapted to ride in keyway 114, whereby the rotation of wheel 54 is transmitted to shaft 46' irrespective of the longitudinal location of shaft 116. After assembly, the end of keyway 114 is closed to retain shaft 116 within bore 112 at the extreme position of longitudinal displacement. Sprocket 62' is freely rotatable about shaft 46' rather than being fixed thereto. Retaining rings 120 are provided to hold said sprocket wheel in position, and a bearing surface is provided between said sprocket and said shaft so that said shaft may rotate independent of said sprocket wheel. Wheel 54 is provided with a pin 122 adapted to engage in one of the plurality of apertures 124 in the face of sprocket wheel 62'. The balance of apparatus 10 remains unchanged.

When wheel 54 and shaft 116 are displaced to the left in bore 112, pin 122 engages one of the apertures 124 in sprocket 62' so that said sprocket wheel and shaft are both rotated in response to the rotation of wheel 54. Further, when wheel 54 and shaft 116 are displaced to the right, pin 122 is disengaged from the sprocket wheel and the shaft 46' may be rotated independent of sprocket wheel 62'. Said sprocket wheel is connected, by means of the other sprocket wheels and chains to shafts 48, 50 and 52 and the inertia of this arrangement serves to prevent sprocket wheel 62' from rotating due to any frictional force that may exist between said sprocket wheel and shaft 46'. Accordingly, in this embodiment first bar 26, and therefore first sheet 96, may be displaced both in conjunction with and independent of the other of said bars and sheets.

This embodiment adds to the flexibility of the apparatus according to the invention by permitting the creation of the photographic illusion that the portion of the total scene disposed on sheet 96 is moving toward or away from the other of said portions. This effect is created by, between each successive photograph taking, engaging pin 122 in sprocket wheel 62' and displacing all of said shafts in the usual manner, and then, disengaging pin 122 and displacing only sheet 96 in either direction a further increment. This further incremental change in the distance traversed by the portion of the total scene disposed on sheet 96 changes the speed at which that portion appears to be passing the camera, and therefore the apparent distance of the portion from said camera. The apparatus according to the invention could also be modified in a like manner to permit any one or all of the other of said shafts 48, 50 and 52 to be rotated independently a further amount between successive photograph taking, thereby further adding to the flexibility of the apparatus according to the invention.

The means for controlling relative movement of sheets 96, 97, 98, and 99 need not be the sprocket wheels and chains utilized in the embodiments shown in the drawings. The desired result could also be accomplished by other means including but not limited to gears and lever arms.

The method of animation according to the invention consists of dividing a total scene into a plurality of substantially two-dimensional portions according to the distance of said portions from the viewing point of said total scene, disposing a plurality of said two-dimensional portions in adjacent juxtaposed overlapping relation and successively photographing said related portions, displacing each of said portions in an edgewise direction between successive photograph takings a distance substantially inversely proportional to the distance of said respective portion from the viewing point of said total scene. By "adjacent juxtaposed overlapping relation" is meant the positioning of the two-dimensional portions in contiguous or very close side-by-side relation as compared with the substantial spacing proportional to the spacing of the scene portions in the total scene taught in the prior art arrangements heretofore referred to. This method may be modified by displacing one of said portions, between successive photograph takings, a distance which varies by an amount which changes with each successive photograph from the distance substantially inversely proportional to the distance of said respective portion from the viewing point of said total scene. This modification permits the creation of the photographic illusion that said portion is moving toward or away from the other of said portions.

In still another modification, the appearance of at least one of said scene portions my be varied between successive photograph takings to give the effect of animation to a figure shown on said portion.

It will thus be seen that the object set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What I claim is:

1. A method of animation comprising dividing a total scene into a plurality of substantially two-dimensional portions according to the distance of said portions from the viewing point of said total scene; disposing a plurality of said two-dimensional portions in adjacent juxtaposed overlapping relation; and successively photographing said juxtaposed portions, displacing each of said portions between successive photograph takings in an edgewise direction a distance substantially inversely proportional to the distance of said respective portion from the viewing point of said total scene to create, in a series of frames as the same are projected, a photographic illusion of three-dimensions.

2. The method as recited in claim 1 wherein at least one of said portions is displaced, between successive photograph takings, a distance which varies, by an amount which changes with each successive photograph, from the distance substantially inversely proportional to the distance of said respective portion from the viewing point of said total scene, whereby, in a series of frames as the same are projected, the photographic illusion is created that said portion is moving toward or away from the other of said portions.

3. A method of animation as recited in claim 1, including changing the appearance of at least one of said scene portions between successive photographs to give the effect of animation to a figure shown on said portion.

4. An apparatus for animating a motion picture formed from a series of still pictures comprising a camera; a plurality of transparent sheets each having, disposed thereon, a portion of a total scene divided according to the distance of each portion from the viewing point of said total scene; means for supporting said sheets in adjacent juxtaposed overlapping relation in the field of said camera; and a plurality of displacing means, each of said displacing means being adapted to displace one of said sheet in an edgewise direction.

5. An apparatus as recited in claim 4, including means for controlling the relative movement of said sheets whereby each of said sheets is displaced a distance substantially inversely proportional to the distance of the portion of said total scene disposed thereon from the viewing point of said total scene.

6. An apparatus as recited in claim 4, wherein said supporting means supports said sheets in contiguous relation, each of said displacing means engaging its respective sheet in the region of at least one edge thereof.

7. An apparatus as recited in claim 5, including drive means connected to one of said displacing means for operation thereof, said controlling means being connected to said drive means for imparting the drive thereof to the displacing means of the other of said sheets.

8. An apparatus as recited in claim 7, wherein each of said displacing means includes a rotating shaft, said controlling means including a plurality of sprocket wheels mounted on said shafts and a plurality of chains engaging said sprocket wheels and interconnecting said shafts, the relative diameter of the sprocket wheels engaging each chain being proportional to the relative distance that the sheets associated with said sprocket wheels are to be displaced.

9. An apparatus as recited in claim 7, wherein said drive means is provided with a graduated scale to facilitate successive displacement of said sheets in predetermined increments.

10. An apparatus as recited in claim 5, including illumination means disposed below said transparent sheets in the field of said camera.

11. An apparatus as recited in claim 5, including means for displacing at least one of said sheets a further distance to create the illusion that the portion of said total scene disposed on said sheet is moving toward or away from the portions disposed on other of said sheets.